2,986,461
MANUFACTURE OF REFINED MANGANESE

Charles Daniel Ménégoz and André Jacques Galy, Grenoble, France, assignors to Pechiney, Compagnie de Produits Chimiques et Electrometallurgiques, Paris, France, a corporation of France No Drawing. Filed Dec. 10, 1958, Ser. No. 779,298
Claims priority, application France Dec. 21, 1957
11 Claims. (Cl. 75—80)

The present invention, which is the result of applicants' researches, relates to a process for the manufacture of refined manganese having less than 0.5% impurities from commercial ferromanganese containing 75–80% Mn, 12–15% Fe, 6–8% C and 0.5–4% Si.

It has already been proposed to prepare very pure manganese by distilling granulated ferromanganese in a vacuum by raising the temperature of the charge in successive steps, the first step being at a temperature lower than the melting point of the ferromanganese used. The manganese which lies on the surface of each grain is sublimated off, leaving behind a layer of porous carbon, thereby making it possible to raise subsequently the distillation temperature to levels higher than the melting point of ferromanganese. The distillation is thereby speeded up and the graphite layer, which surrounds each grain, retains the liquid ferromanganese and maintains a large volatilization surface.

This process gives excellent results when Mn-rich ferromanganese having a comparatively high melting point is used as the raw material. However, in the case of ferromanganese having a 75–80% Mn content and melting points in the neighborhood of 1100° C., the distillation is extremely slow when the temperature is maintained below the melting point of the ferromanganese, and the output of the distillation furnace is considerably reduced.

The present process makes it possible to avoid this disadvantage. The process of this invention consists in thoroughly mixing the ferromanganese—ground and screened to a predetermined granulometry (particle size distribution)—with a quantity of carbon sufficient to create a kind of barrier, shield or screen between the various grains of the alloy and prevent them from coalescing at temperatures higher than the melting temperature.

In this manner, it is possible to heat the mixture directly to temperatures as high as 1200 to 1400° C. and at a pressure within the range of a few microns to a few millimeters, while preserving the individuality of the ferromanganese granules and, hence, a sufficiently large volatilization surface to achieve an industrial distillation speed and an industrial rate of production.

A proportion of 15 to 20% carbon for 85–80% ferromanganese enables satisfactory results to be obtained, but it is preferable to increase the proportion of carbon to 25–30% for 75–70% ferromanganese. The proportion of carbon can, of course, be increased still more, and it is not possible to fix an upper limit since an excess of carbon is not harmful; however, there is no advantage in exceeding a proportion of 30% of carbon.

It is possible to carry out the process of the invention according to several embodiments:

(1) With particle sizes (granulometry) ranging from 1 to about 5 millimeters, it is possible to carry out the bulk distillation of an intimate mixture of ferromanganese powder and coke powder (preferably petroleum coke) without using any binder. Without being limited thereto, it is advantageous to select a narrow and identical range of granule sizes for both ferromanganese and coke, so as to secure voids between the granules and facilitate the liberation of the vapors. For example, granules of 1 to 2 mm., or 2 to 3 mm., or else 3 to 5 mm., make it possible to obtain good results. When the granule (particle) size exceeds 5 millimeters, it seems that the wick effect of the carbon granules is no longer sufficient to prevent coalescence. However, the use of granules larger than 5 millimeters mixed with the granules of smaller sizes is also within the scope of the present invention.

An example of the manner of carrying out this embodiment of the invention is given below.

*Example 1*

Two automatic metering scales continuously feed into a screw mixer:

35 kg. ferromanganese of 3 to 5 mm. granules,
15 kg. pitch coke ("pechcoke") of 2 to 3 mm. granules.

200 kg. of this mixture are charged onto the carbon hearth of a vacuum furnace which is at a temperature of 1000° C.; the charge is distributed at the rate of 100 kg. Mn per square meter. A vacuum of 20 to 30 microns is established in the furnace, the temperature is then progressively raised to 1300° C. and maintained at this level for 12 hours. Cooling to 1000° C. is then permitted to take place and the furnace is drawn (discharged). About 100 kg. manganese are collected at the condenser, and there are obtained 100 kg. of residue consisting of 60 kg. pitch coke and 40 kg. carburized ferroalloy granules. The latter, being much heavier and magnetic, are easily separated from the pitch coke which is recycled.

In order to obtain a sufficient output from a distillation furnace which operates batchwise, it is preferable to charge about 50 kilograms manganese per square meter of furnace hearth. The granule mixture then forms a layer 4 to 6 centimeters thick. Under these conditions, it is not possible to use a mixture of powders in bulk with a size of granule smaller than 1 millimeter, for example, 0.5 to 1 millimeter, because the escape of manganese vapor is impeded and the heat transfer inside the layer is too slow. It would be possible to arrange granules of such size in a thinner layer but, in order to maintain an adequate production, it is preferred to agglomerate particles (powders) finer than 1 mm.

(2) In a second embodiment of the invention, a powdered mixture of ferromanganese and graphite is sintered at 1200°–1300° C. in a vacuum, or an inert atmosphere, at various pressures. The resultant sintered blocks are then crushed and sized before being charged into the dissociation furnace. As an alternative, the powder can also be sintered on a honeycombed (cellular) hearth, thereby directly yielding granules of the required dimensions.

Further, one can sinter a powdered mixture and distill the sintered product from a preceding run in the same furnace, as is shown by the following example:

*Example 2*

An intimate mixture is made of the following:

Powdered ferromanganese passing through
  a 100 mesh screen _____ 45 kg. or 75%.
Powdered graphite also passing through
  a 100 mesh screen _____ 15 kg. or 25%.

This mixture, designed to be sintered, is charged into three graphite boats each of 0.12 m.² surface and 8 cm. depth. These boats are provided with a relatively tight cover and are first charged onto the hearth of a vacuum furnace. Above these three boats, there are introduced three other identical boats, containing sized fragments from a previous sintering operation (12 kg. per boat), as follows:

First boat _____ Fragments of 5-25 mm.
Second boat _____ Fragments of 25-50 mm.
Third boat _____ Fragments of 50-80 mm.

The fines are recycled during a subsequent sintering operation.

The furnace is closed, evacuated and its temperature raised to 1300° C. for 10 hours. Thereupon, heating is stopped and the furnace is drawn (discharged) at about 800° C.

There are collected about 52–53 kg. hard and dense sinters which contain 45% Mn. 15–20% of the Mn initially contained in these products is distilled off during the operation.

The blocks thus obtained are crushed and sized as indicated above for use in the succeeding dissociation. The dissociated sinters were 98% exhausted. At the condenser there are collected 26 kg. refined manganese. The furnace is recharged, as before, for a further operation.

(3) The powdered ferromanganese and coke mixture can also be agglomerated by means of pitch or a hydrocarbon-base binder. The compressed pellets, balls, or blocks thereby obtained are then crushed and sized. This constitutes a third embodiment of the invention.

Direct charging of these agglomerates into the vacuum furnace has the disadvantage of producing copious liberation of hydrocarbon vapors which contaminates the surfaces provided for the condensation of metal, as well as the vacuum equipment. It is therefore advantageous to submit the agglomerates to a pretreatment designed to vaporize or coke part of the binder, for example, baking in a vacuum, or in a controlled atmosphere at various pressures and at a temperature from 100° to 1350° C., according to circumstances.

The carbon mixed with ferromanganese can also be a residue from a previous distillation run, and which residue is used as such, or after treatment for removal of all or part of its contained ferrosilicon. The treatment can consist of magnetic separation, selection (separation) by density, air separation, flotation, etc.

*Example 3*

Into a mixer provided with a heating device, there are introduced 350 kg. powdered ferromanganese passing through a 50 mesh screen,
125 kg. petroleum coke passing through an 80 mesh screen.

While mixing both powders, the temperature is raised to 120–125° C. Thereupon, 40 kg. soft pitch are added. The mixture is kneaded for about ½ hour at this temperature. The paste is treated in a pellet press yielding pellets of about 15 mm.

These pellets are then coked by remaining for several hours in a tight furnace at 800°–900° C. in a neutral or reducing atmosphere. This treatment removes the major part of the volatile constituents of the pitch and creates inside the pellets ducts favorable to the distillation of ferromanganese.

After this treatment, the pellets contain about 55% manganese.

When the vacuum furnace provided for the dissociation is at a temperature of 1350° C., and under a vacuum of a few microns, 100 kg. of the pellets are charged into it through vacuum-tight lock chambers. The temperature is maintained at 1350° C. for 8 hours. At the end of this time, 100 kg. pellets are again charged through the lock chambers. The same operation is successively repeated five times. The furnace temperature is lowered to 1000° C., 250 kg. refined manganese are withdrawn, and the residue on the hearth is extracted.

(4) Finally, there can be prepared granules or pellets from finely divided ferromanganese and coke bonded with an aqueous binder, for example, a glue the volatile constitutents of which can generally be removed by a low temperature treatment.

Granulation can be obtained with powders of different granulometry, but the best results are obtained with fine granules of small sizes (for example, less than 0.3 mm.) and with the identical granulometry for both coke and ferromanganese.

Widely different types of glues can be used, vegetable glues (molasses, gum arabic), animal glues (bone, leather glues), chemical glues (various plasticizers). It is advantageous that they be quick-setting so that the pellets attain appreciable resistance to abrasion rapidly whereby their manufacture is facilitated. The glue should also keep its binding power following the treatment recommended for the pellets before distillation.

The aforementioned treatment will, for example, be a simple cold treatment, under vacuum, which is effective if the glue solvent be a comparatively volatile liquid. It can also consist of a drying treatment in a normal atmosphere at a temperature below 180° C., or else a vacuum treatment, or a treatment in a controlled atmosphere at a variable pressure, and at temperatures ranging from normal temperature to dissociation temperature.

By arranging the granules (or pellets) in a thin layer (a few centimeters thick), the above treatment is enhanced.

As an additional precaution for preventing the sticking together of the granules or pellets during dissociation, the manufacture of the granules can be finished off with pure carbon. Each ball will then be covered with an absorbent layer of petroleum coke, which preexists at the moment when the ferromanganese reaches its melting temperature.

*Example 4*

Into a pellet rolling device ("drageoir") or granulating pan with a pan 1.20 m. diameter and 0.40 m. deep, rotating at 25 r.p.m., there are fed by means of continuous separate feeders:

12.6 kg./hour powdered ferromanganese passing through a 50 mesh screen (about 0.3 mm.)
5.4 kg./hour powdered petroleum coke of same size of granule
2 kg./hour bone-glue solution in the proportion of 1 kg. solid glue for 8 liters water Every hour, there are collected 20 kg. granules of 12 to 20 mm. in size; these are allowed to dry in air, in a 5 cm. layer, for several hours.

The granules are next dried at 180° C. in a resistance furnace in the open air, in loads of 100 kg. on pans containing layers 5 cm. thick.

The drying lasts three hours. The granules (or pellets) lose 10 to 12% of their weight. Their crushing strength is then 30 to 40 kg. per pellet and their manganese content is 50 to 55%. They are ready for the dissociation process.

On the hearth of a vacuum furnace in which prevail a pressure of a few microns and a temperature of 1350° C., 25 kg. granules are charged through hoppers with vacuum-tight lock chambers. The charge is spread on the hearth in a layer 2 to 4 cm. thick. The temperature is maintained at 1350° C. for two hours and thereupon, a new identical charge of granules is introduced over the first charge, and heating is resumed for two hours at 1350° C.

The same process is repeated successively 20 times. Thereafter, the temperature is reduced to 1000° C. The furnace is opened, the residue is removed with a scraper and about 230 kg. refined manganese are collected at the condenser.

Example 5

Automatic feeders continuously feed into a pellet rolling device ("drageoir") or granulating pan:

20 kg./hour powdered ferromanganese passing through a 50 mesh screen 4.25 kg./hour powdered pitch coke passing through a 50 mesh screen 0.750 kg./hour powdered cement constituted of a lime aluminate containing 30% CaO 1.5 kg./hour aqueous binder, for example, a bone-glue solution containing 1 kg. solid glue for each 20 liters water 25 kg. of 12–15 mm. size granules are collected per hour and allowed to dry 12 hours at room temperature. Thereupon, the water is eliminated by drying for three hours at 130° C. in open air. The granules lose 5–6% of their weight. The residual water is absorbed by cement which will contribute very great hardness to the granules during the duration of the entire subsequent dissociation (after treatment at 130° C., the glue introduced in the proportion stated above, does not have any bonding function).

With the furnace at 1100° C. under vacuum, 100 kg. granules are charged through a lock chamber. The temperature is maintained at 1100° C. for one hour in order to eliminate the water from the cement without appreciably volatilizing manganese. The temperature is then quickly raised to 1350° C. and is maintained at this level for eight (8) hours. Five similar cycles are carried out one after the other, while maintaining the vacuum, before 280 kg. refined manganese and residue are withdrawn from the furnace.

The above examples have been given to enable a better understanding of the invention, but they are in no way limiting. The invention is not limited to the embodiments which have been particularly described; on the contrary, the invention embraces all their possible variations.

Other cements such as calcium silicates or silico-aluminates can be used.

We claim:

1. In the process of producing refined manganese from a ferromanganese alloy having a manganese content of 75–80% by evaporation of the manganese in a vacuum, the steps of: forming an intimate mixture of particles of said alloy with at least 15% particles of carbonaceous material, and heating said mixture in a vacuum at a temperature above the melting point of the alloy to thereby form between the individual particles of the alloy a barrier effective to prevent coalescence of said alloy particles at the heating temperatures, whereby the individual alloy particles preserve an effective evaporating surface for the manganese.

2. Process according to claim 1, wherein the granulometry of the carbon is substantially the same as of the alloy particles.

3. Process according to claim 1, wherein the carbonaceous material forms 20–30% of the entire mixture.

4. Process according to claim 1, wherein the heated mixture is a bulk mixture consisting of said alloy and carbonaceous material.

5. Process according to claim 1, wherein the mixture is sintered at a temperature within the range of about 1200° to about 1300° C., and the sintered mass is granulated before evaporating the manganese therefrom in a vacuum.

6. Process according to claim 1, wherein the alloy is mixed with coke, and the mixture is agglomerated by a binder and granulated.

7. Process according to claim 1, wherein the manganese is evaporated from the mixture at a temperature within the range of 1200°–1400° C.

8. Process according to claim 1, wherein the ferromanganese alloy has a melting point in the neighborhood of 1100° C.

9. Process according to claim 6, wherein there is used a hydrocarbon-base binder, and wherein the granulated mass is preliminarily heated at atmospheric pressure to drive off volatile constituents of the binder before evaporating the manganese in a vacuum.

10. Process according to claim 6, wherein there is used a water soluble binder, and wherein the granulated mass is heated to 130° C. in open air to drive off water before eveaporating the manganese in a vacuum.

11. Process according to claim 6 wherein the particles of the alloy and coke are bonded by a water soluble binder and cement.

References Cited in the file of this patent

UNITED STATES PATENTS

| 2,848,318 | Tardieu | Aug. 19, 1958 |
| 2,860,965 | Ruelle | Nov. 18, 1958 |

FOREIGN PATENTS

| 1,160,614 | France | Mar. 3, 1958 |
| 451 | Great Britain | Feb. 20, 1862 |